Dec. 5, 1967     G. W. ELLENBURG     3,355,920
METHOD OF SPINNING CUP-SHAPED ARTICLES AND APPARATUS THEREFOR
Filed June 28, 1965     2 Sheets-Sheet 1
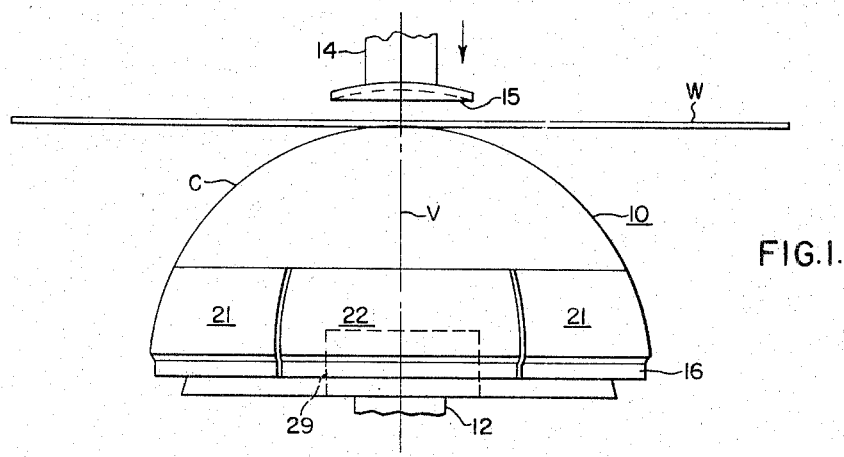
FIG.1.
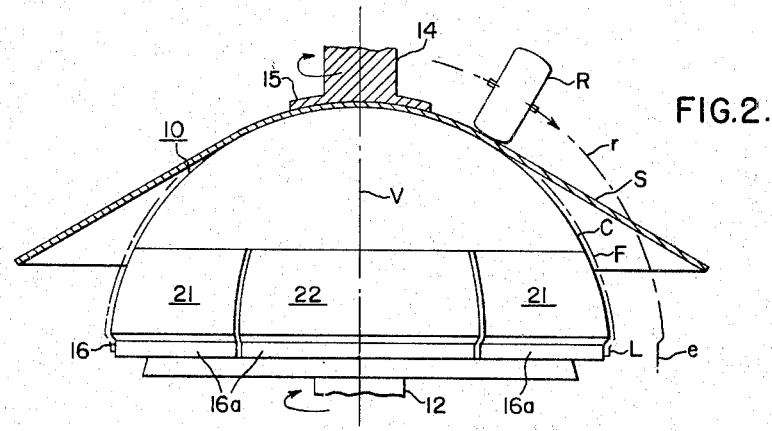
FIG.2.
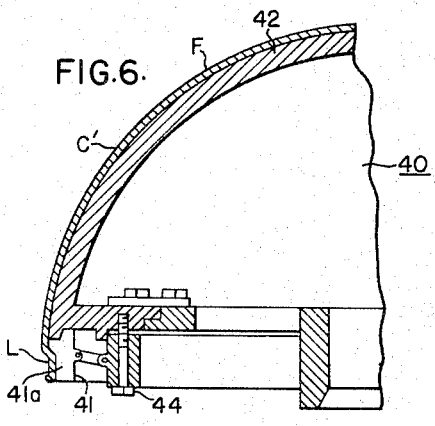
FIG.6.
FIG.7.
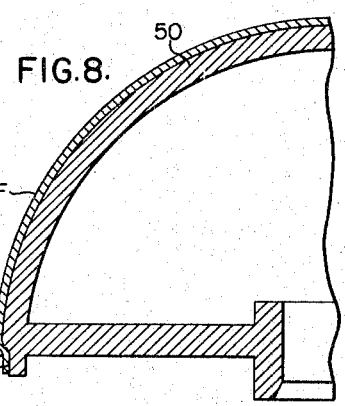
FIG.8.
INVENTOR
George W. Ellenburg
BY
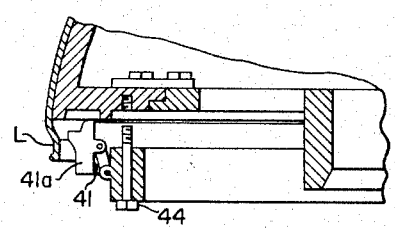

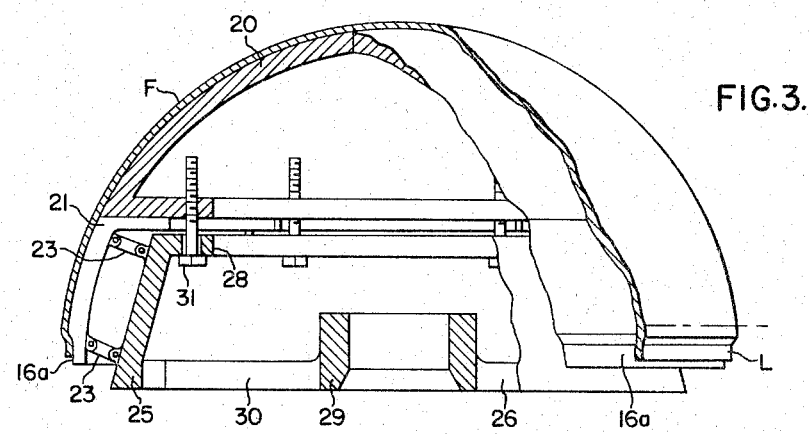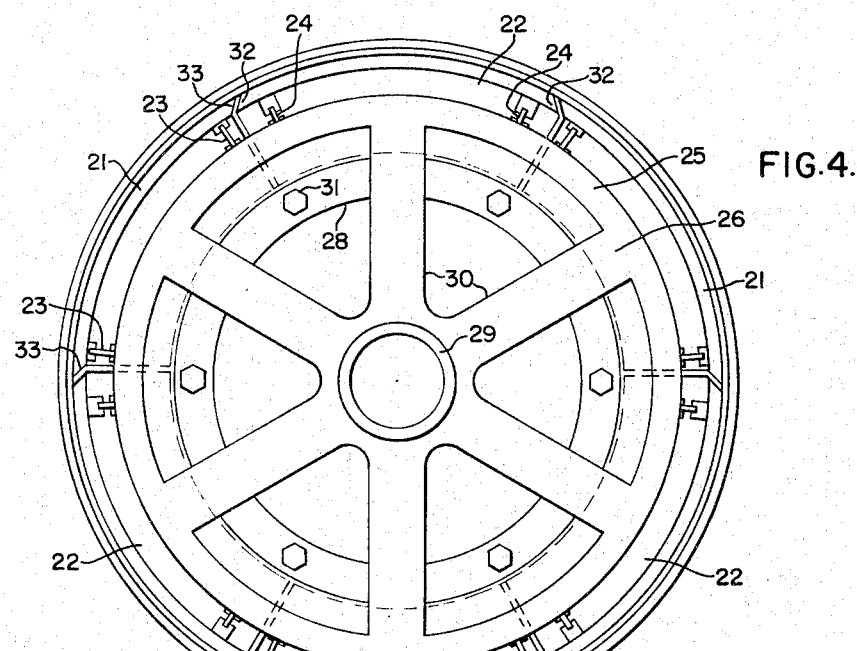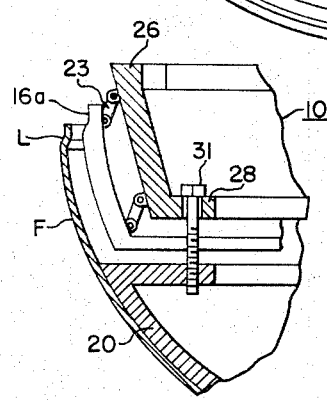

United States Patent Office 3,355,920
Patented Dec. 5, 1967

3,355,920
METHOD OF SPINNING CUP-SHAPED ARTICLES AND APPARATUS THEREFOR
George W. Ellenburg, Ardmore, Pa., assignor to Westinghouse Electric Corporation, Pittsburgh, Pa., a corporation of Pennsylvania
Filed June 28, 1965, Ser. No. 467,247
21 Claims. (Cl. 72—83)

ABSTRACT OF THE DISCLOSURE

In accordance with the invention, the method includes the steps of heating a preliminary sheet metal workpiece, spinning the heated workpiece to a cup-shaped configuration on a mandrel having a size and shape conforming to the final cup-shape desired, spinning a peripheral retaining lip at the open end of the cup-shaped workpiece, cooling the workpiece in situ to creep size the workpiece, and then cutting off the retaining lip portion of the workpiece.

---

This invention relates to material working and more particularly to the fabrication of hollow cup-shaped articles made of relatively thin material by spinning on a mandrel.

In the spinning of sheet metal, such as steel, into cup-shaped articles of large radius, for example spun articles of hemispherical, paraboloid, hyperboloid, conical, etc., configurations, it is extremely difficult and practically impossible with presently known techniques, to impart to the article the precise dimensions and smoothly surfaced configuration of the mandrel onto which it is spun during the spinning process. Accordingly, in instances where preciseness of dimensions and smoothness of configuration is required, as for example in large rocket motor dome members, it is the practice to machine the inside and outside surfaces of the spun article to remove ripples and irregularities and to attain the required dimensions and configuration. This method is expensive with regard to both labor and material, since considerable metal must be cut away as scrap metal by time consuming processes and the original thickness of the workpiece is considerably thicker than the required thickness of the completed article to permit the article to be thus machined to final requirements.

To minimize the machining away of metal, as explained above, the spun cup-shaped article may be subjected to a "stretch sizing" operation, wherein it is placed on a precisely shaped and sized mandrel having a higher coefficient of expansion than that of the article and then both the mandrel and the article are heated to an elevated temperature at which distention of the article occurs by "creep action" of the metal. Since the mandrel expands thermally at a faster rate than the article, the article is stretched, thereby substantially eliminating the irregularities in its contour formed by the spinning operation and substantially assuming the trueness of size and form of the mandrel.

The above method and apparatus for "stretch sizing" is more fully disclosed in applicant's patent application No. 337,922, filed Jan. 15, 1964, now Patent No. 3,315,513, and assigned to the same assignee as the present invention.

Although applicant's above method and apparatus is highly effective and desirable and effects substantial economies in material, the apparatus required in addition to the spinning mandrel and the additional steps required to "creep size" the spun article partially reduce some of the economies attained thereby.

It is a primary object of this invention to provide a method for spinning a hollow cup-shaped metal article and creep sizing the article on the same mandrel.

A further object is to provide a method for spinning a hollow cup-shaped metal article on a mandrel and creep sizing the thus spun article on the same mandrel before final removal therefrom.

A still further object is to provide a method for hot spinning a hollow cup-shaped metal article that employs the cooling step after spinning to creep size the article before removal from the mandrel.

Yet another object is to provide a mandrel for facilitating employment of the method defined in the above objects.

Briefly, in accordance with the invention, the method comprises:

(1) Heating a preliminary sheet metal workpiece to an elevated temperature suitable for spinning;

(2) Spinning the heated workpiece to a cup-shaped configuration on a substantially cooler mandrel having a size and shape closely conforming to the required final cup-shaped configuration of the workpiece, and imparting an annular peripheral lip at the open end of the cup-shaped workpiece to retain the thus spun workpiece in tightly fitting relation with the mandrel;

(3) Cooling the cup-shaped workpiece in situ, thereby effecting thermal shrinkage of the workpiece on the mandrel with concomitant stretching of the workpiece by creep action to a shape and size more closely approaching the shape, dimensions and smoothness of contour of the mandrel;

(4) Removing the thus "sized" workpiece from the mandrel; and (5) Cutting off the annular lip portion of the workpiece.

If it is desired to relieve the workpiece of stresses induced during step 3, the workpiece may be reheated to a temperature sufficient to effect such relief, before step 4. When this reheating step is employed, removal of the workpiece in step 4 is facilitated due to the additional creep sizing and/or thermal expansion of the workpiece.

In accordance with another aspect of the invention, the mandrel is preferably provided with a circumferential recessed portion to facilitate formation of the annular restraining lip on the workpiece during spinning. Further, in accordance with another aspect of the invention, the circumferential portion of the mandrel having the recess is formed in a manner to be retracted to facilitate removal of the workpiece without the necessity of reheating the workpiece.

The above and the objects are effected by the invention as will be apparent from the following description and claims taken in connection with the accompanying drawings, forming a part of this application, in which:

FIG. 1 is an elevational view, illustrating placement of the preliminary sheet metal workpiece on one novel form of mandrel to initiate the method of spinning and sizing thereof in accordance with the invention;

FIG. 2 is a view similar to FIG. 1, but illustrating the spinning step;

FIG. 3 is a detailed longitudinal sectional view, taken on a larger scale and illustrating partially in section and partially in elevation the mandrel of FIGS. 1 and 2 with the spun cup-shaped article thereon;

FIG. 4 is a bottom view of the structure shown in FIG. 3;

FIG. 5 is a fragmentary inverted sectional view of the structure shown in FIG. 3, but with the mandrel in the retracted position;

FIG. 6 is a view similar to FIG. 3, but showing another form of mandrel;

FIG. 7 is a view similar to FIG. 6, but with the mandrel in the retracted position; and FIG. 8 is a view similar to FIG. 6, but showing still another form of mandrel.

Referring to the drawings in detail, FIGS. 1 and 2 illustrate, in a highly simplified manner, the initial steps for spinning a preliminary flat sheet metal disc-shaped workpiece W onto a dome-shaped spinning mandrel 10 formed in accordance with one aspect of the invention. As well known in the art, the spinning mandrel 10 is mounted in an upright position on a rotatable machine driven arbor 12 and preferably, as typical in the spinning of large and heavy articles, the arbor 12 is rotatable about a vertical axis V.

Referring to FIG. 1, with the arbor 12 stationary, the workpiece W is centered and placed on the mandrel 10 with a "live center" holding arbor 14 concentric with the driven arbor 12 and disposed initially in upwardly retracted position. The arbor 14 has a concave end portion 15 for clamping the workpiece W to the mandrel and, as illustrated in FIG. 2, the arbor 14 is lowered to clamp the workpiece W to the mandrel and impart an initial cup-shape to the workpiece W.

The mandrel 10 has a smooth external contour C corresponding precisely to that required to be imparted to the workpiece W, and may be defined by any suitable surface of revolution such as hemispherical, hyperboloid, paraboloid, conical or combinations of such surfaces. However, for simplicity of illustration and description, and not by way of limitation, the mandrel 10 is illustrated as of substantially hemispherical shape. Accordingly, in the subsequent description of the mandrel, the terms "polar axis," "latitude" or "latitude angle," "longitude lines," "equator," "great circle," "meridional direction," and similar terms are employed in their normal and well understood context with reference to revolvable spheres, of which our planet earth is the best known example.

To spin the preliminary workpiece W to its desired hollow cup-shape or dome-shape, hemispherical in the examples shown, the attached mandrel 10 is rotated about its polar axis by the arbor 12, as indicated in FIG. 2, and a heavy roller R is brought to bear against the outer surface S of the workpiece W and constrained to follow an arcuate path r along a longitude line conforming to the outer contour C of the mandrel and extending from a polar region of the mandrel to an equatorial region at the base of the mandrel.

The mandrel 10 is provided with an annular recess 16 extending peripherally about the equatorial region at the base of the mandrel 10 and having a radius that is of slightly less extent than the spherical radius, i.e. a diameter less than that of a great circle. The roller R is moved down and around the recess 16, at the end portion of its path r as indicated at e, thereby forming an annular inturned lip portion L defining a circular opening on the cup-shaped spun article F (indicated by the dot and dash lines).

Before the spinning operation, the workpiece W is heated to an elevated temperature so that the spinning operation may be conducted in a temperature range at which the yield strength of the metal is relatively low, even though some cooling of the workpiece does occur during the spinning step.

One class of metals that is highly desirable is known as maraging steel (a word derived from "martensite" and "aging"). The maraging steels are martensite in the annealed state and attain ultra high strength and hardness on being aged in the annealed, or martensitic condition, i.e. on heating to an elevated temperature below that at which reversion to austenite sets in. For example an 18% Ni maraging steel with an initial yield strength of 100,000 p.s.i., on being heated to a temperature of about 850° F. to 950° F. and aged for a period of 3 hours in this temperature range may reach a yield strength of about 250,000 p.s.i. However, maraging steels may be "hot worked" at higher temperatures and then cooled to ambient temperature in an annealed state.

When the metal employed is a maraging steel, the workpiece W may preliminarily heated to an elevated temperature of about 2,000° F., but below the reversion temperature, in any suitable manner, for example in a furnace, and after the spinning operation, the cup-shaped article F is allowed to cool on the mandrel. As the article F cools, since the initially cool mandrel 10 is disposed within the article F, it is heated by heat exchange from the article and retains its heat for a longer period of time than the article. Accordingly, the article F undergoes thermal contraction while the mandrel 10 undergoes thermal expansion, and the article F is tightly restrained on the mandrel 10 and prevented from slipping off by movement in polar direction during the resulting differential expansion by the inturned lip portion L.

The cup-shaped article F is allowed to cool slowly on the mandrel to about room temperature and, during such cooling, high tensile stresses are generated therein in longitudinal and meridional directions causing the material to creep and yield to relieve these stresses. A major portion of the creeping and yielding takes place in the upper temperature range where the yield strength of the material is very low and as the material approaches the lower temperatures the yield strength increases. Accordingly, the creeping diminishes. However, ample time is required during this cooling step to permit the creeping action to slowly, but effectively, relieve the stresses and cause the article F to be "stretch sized" by the mandrel 10. This stretch sizing operation is highly effective to remove substantially all of the ripples and irregularities in the contour of the article F attained during the spinning operation and imparts to the article F a surface contour C' smoothly and precisely conforming to the external surface C of the mandrel 10.

To permit the ready removal of the thus sized article F after cooling, from the mandrel 10, the mandrel 10 is preferably of hollow open-ended form, as best shown in FIGS. 3 and 4, with a hollow spherical central portion 20 extending peripherally from its pole to a latitude of about 30° and an annular array of alternately mating spherical segments 21 and 22 of uniform latitudinal width and extending from a latitude of about 30° to the equatorial region at the base of the mandrel. Each of the segments 21 includes an arcuate segment 16a of the recess 16. The segments 21 and 22 are pivotally connected by long and short links 23 and 24, respectively, to the annular rim 25 of an internally disposed spider member 26. The spider member further has an annular flange 28 extending radially inwardly from the rim portion 25 and a central hub portion 29 connected to the rim 25 by a plurality of spokes 30. The hub portion 29 is employed to mount the mandrel 10 for rotation about its central or polar axis on the driving arbor 12, as indicated in FIG. 1.

The links 23 and 24 are swingable in longitudinal planes and so arranged that when the spider member 26 is in the uppermost position (when viewed as in FIG. 3) the segments 21 and 22 are in the distended position shown and form a smooth hoop-like spherical continuation of the mandrel portion 20. In the distended position the arcuate segments 16a are peripherally aligned with each other to form the recess 16 and the segments 21 and 22 withstand the compressive forces of the article F, by compressive hoop strength. The segments 21 and 22 are forcibly maintained in the distended position by an annular array of bolts 31 extending through the annular flange 28 into threaded relation with the central mandrel portion 20 and holding the spider 26 in its uppermost position.

The longitudinal edges 32 of the segments 22 converge in radially outward direction, as seen in FIG. 4, while the longitudinal edges 33 of the segments 21 diverge in radially outward direction. Accordingly, after the spun and sized article F has cooled to a low temperature and preferably ambient temperature, the mandrel 10 together with the article F may be lifted from the driving arbor 12 by any suitable means and preferably placed in an inverted position, as indicated in FIG. 5. The bolts 31 are then unscrewed from the mandrel portion 20 to a degree sufficient to release the restraint on the segments 21 and 22, thereby permitting the segments to retract in radially inwardly direction to a degree sufficient to release the annular inturned marginal lip L on the article F from the recess segments 16a. The short links 24 swing the associated segments 22 inwardly at a faster rate with respect to the swinging movement of the segments 21 by the long links 23, thereby permitting the segments to retract without mutual interference.

After retraction of segments 21 and 22 as described above, the mandrel is lifted from the article F in any suitable manner while the article F is restrained by gravity, and the annular lip L on the article F may be cut away in any suitable manner.

As described above, the arcuate segments 21 and 22 extend from the equatorial region of the mandrel 10 to a latitude of about 30°. This arrangement provides sufficient release of the frictional forces between the article F and the mandrel 10, when the segments are retracted. However, the latitudinal width of the segments is primarily established by the coefficient of friction between the outer surface C of the mandrel 10 and the inner surface of the article F, and the minimum latitudinal angle is preferably the angle whose natural trigonometric tangent is equal to the coefficient of friction between the two surfaces.

FIGS. 6 and 7 illustrate a modified form of spinning mandrel 40 that may be employed for spinning and stretch sizing the hollow cup-shaped article F in accordance with the invention. The mandrel 40 is substantially similar to the mandrel 10, but is provided with an annular array of alternately mating spherical segments 41 (only one shown) similar to the segments 21 and 22, but having a substantially smaller latitudinal width. The segments 40 are arranged in the same manner and are retractable and extensible in the same manner as the segments 21 and 22 and are provided with arcuate recesses 40a for forming the inwardly turned lip L on the article F during the spinning operation. In this embodiment, the major or central portion 42 of the mandrel 40 is made of stainless steel or other material with a higher coefficient of expansion than the material of which the article F is made.

The mandrel 40 may be employed in the method of spinning and stretch sizing described in conjunction with the first embodiment, but is preferably employed when the article F is formed from a normal tool steel, such as medium carbon, low alloy, high tensile strength steel. Tool steels of this type have different hardening characteristics than the maraging steels in that, when cooled from above their critical temperature (about 1400° F.), they become martensitic and hard and require a tempering or normalizing and tempering treatment before they can be machined.

The method of spinning and stretch sizing the article F with the mandrel 40 is the same as with the mandrel 10. However, after the article is cooled to a low temperature (and preferably to ambient temperature) the mandrel 40 together with the attached article F is reheated in any suitable manner, for example in a furnace, to an elevated temperature of about 1200° F. to stress relieve and temper the article F. During this latter operation, the stainless steel expands at a greater rate than the article F and induces tensile stresses in the article F, thereby causing the article to creep to a large radius.

The mandrel 40 and the article F are then jointly cooled to substantially ambient temperature. The thermal contraction of the mandrel 40 being greater than that of the article F, the clamping action due to friction between the two along their interfaces is substantially eliminated.

Accordingly, upon retraction of the segments 41 by loosening the bolts 44, as indicated in FIG. 7, the inturned peripheral lip L on the article F is freed and the article can be removed from the mandrel. Subsequent to removal of the article F from the mandrel, the annular portion containing the lip L may be removed.

FIG. 8 illustrates another mandrel 50, that may be employed in practicing the methods described in conjunction with the collapsible mandrels 10 and 40. The mandrel 50 is similar in size and shape to the mandrels 10 and 40, but is not collapsible. That is, the equatorial portion containing the annular recess 51 is integral with the mandrel and is not retractable. This mandrel is considerably simpler and less costly than the mandrels 10 and 40 and can be employed where the coefficient of expansion of the mandrel material is greater than that of material of which the article F is formed, thereby permitting removal of the article, or in instances where it is desirable to cut away the inturned lip portion L of the article before removal from the mandrel.

By forming the mandrel 50 of a material having a greater coefficient of expansion than that of the article F, for example, stainless steel, the article F may be readily removed from the mandrel by jointly reheating the mandrel and article in a furnace to an elevated temperature after the initial cooling step required to creep-size the article. The reheating step causes the mandrel to expand more than the article, thereby effecting additional stretching or creep-sizing with the result that the article F becomes sufficiently larger than the mandrel to permit removal therefrom without interference by the recess 51.

If the metal of which the article F is formed is a maraging steel, this step tends to increase the hardness of the article which may be a desirable feature in some instances.

If, on the other hand, the metal of which the article is formed is of medium carbon, low alloy, high strength steel, this step provides the required stress relief described in conjunction with the collapsible mandrel 40.

The exact latitudinal position of the lip L may be varied as desired within the equatorial region. For example, if the final shape of the article F is desired to be a true hemisphere extending from the equator (zero latitude) to the pole (90° latitude), the lip L may be formed in the equatorial region sufficiently below the equator to permit removal of the lip by cutting the article F at the equator, and the mandrel recess is positioned accordingly. On the other hand, if the final shape of the article F is desired to be hemispherical with a cylindrical portion below the equator, the lip L may be formed in a region sufficiently below the equator to permit removal of the lip by cutting the article below the equator, and the mandrel recess is positioned accordingly.

It will now be seen that the invention provides an improved method of spinning and sizing a hollow open-ended cup-shaped article of metal that is highly advantageous in the production of large articles to precise contour and permits employment of thinner sheet metal in the initial workpiece, since the final article produced thereby is truer than heretofore and thereby substantially eliminates or minimizes subsequent machining to provide a true and smooth contour of the required dimensions.

It will further be seen that the invention provides a novel mandrel structure and method for spinning and stretch sizing and article on the same mandrel structure in subsequent and related steps, without removal from the mandrel until the article is substantially completely shaped.

While the invention has been shown in several forms, it will be obvious to those skilled in the art that it is not so limited, but is susceptible of various other changes and modifications without departing from the spirit thereof.

I claim as my invention:

1. A method of making a hollow open-ended cup-shaped metal article, comprising the steps of heating a sheet metal preliminary workpiece to an initial temperature of at least 1400° F.;

spinning said heated workpiece on a substantially cooler dome-shaped steel mandrel to substantially the same shape as that of said cooler mandrel, and with an annular portion of reduced radius adjacent the open end in the thus spun workpiece, so that the spun workpiece is retained in tightly fitting relation with the mandrel; and cooling the thus formed workpiece to a temperature below said initial temperature while on the mandrel, thereby effecting shrinkage of the workpiece that is resisted by the mandrel with concomitant yielding and creeping of said workpiece to more precise conformance to the shape and dimensions of the mandrel and to substantially eliminate surface irregularities effected in the spinning step.

2. The method recited in claim 1 and further including the steps of retracting an annular portion of the mandrel to release the workpiece; and removing the thus released workpiece from the mandrel.

3. The method recited in claim 1, and further including the steps of reheating the workpiece to effect stress relief thereof; and removing the thus stress relieved workpiece from the mandrel.

4. A method of making a hollow open ended dome-shaped metal article, comprising the steps of heating a sheet metal preliminary workpiece to at least its critical temperature;

spinning said heated workpiece on a precisely formed dome-shaped axially rotating steel mandrel to a shape substantially conforming to the shape of the mandrel and spinning a restricted circumferential portion adjacent the open end of the thus spun workpiece, so that the spun workpiece is tightly restrained by the mandrel against movement in the axial direction; and stretching the thus formed workpiece to remove irregularities formed in the spinning step and to closer conformance to the surface shape of the mandrel by cooling the workpiece to a temperature below its critical temperature, while permitting the mandrel to rise in temperature by heat exchange with the workpiece, thereby effecting thermally induced shrinkage of the workpiece and thermally induced expansion of the mandrel with concomitant yielding and creeping of the workpiece.

5. The method recited in claim 4, wherein the metal is steel and further including the steps of retracting at least an annular portion of the mandrel adjacent the open end of the dome-shaped workpiece to release the axial restraint on the formed workpiece;

removing the workpiece from the mandrel; and cutting away the restricted circumferential portion of the workpiece.

6. The method recited in claim 4, wherein the metal is steel and further including the steps of reheating the workpiece to effect stress relief thereof;

removing the thus stress relieved workpiece from the mandrel; and cutting away the restricted circumferential portion of the workpiece.

7. A method of making a hollow hemispherical metal article, comprising the steps of heating a sheet metal preliminary workpiece to an initial temperature of at least 1400° F.;

spinning said heated workpiece on a substantially cooler hemispherical steel mandrel to substantially the same spherical radius as that of said cooler mandrel and with an equatorial portion of smaller radius than the spherical radius, so that the thus spun hemispherical workpiece is retained by the mandrel against movement in a direction toward the pole of the mandrel; and cooling the thus formed workpiece to a temperature below said initial temperature, thereby effecting shrinkage of the workpiece on the mandrel with concomitant yielding and creeping of said workpiece to more precise hemispherical shape and dimensions.

8. The method recited in claim 7 and further including the steps of retracting at least an equatorial portion of the mandrel to release the workpiece; and removing the thus released workpiece from the mandrel.

9. The method recited in claim 7, wherein the metal is a low alloy tool steel, and further including the steps of reheating the workpiece to effect stress relief thereof; and removing the thus stress relieved workpiece from the mandrel.

10. A method of making a hollow hemispherical metal article, comprising the steps of heating a sheet metal preliminary workpiece to at least its critical temperature;

spinning said heated workpiece on a hemispherical axially rotating steel mandrel to a substantially hemispherical shape but with a restricted circumferential equatorial portion, so that the thus spun hemispherical workpiece is tightly restrained by the mandrel against movement in the axial direction; and stretching the thus formed workpiece to closer conformance to the surface shape of the mandrel by cooling the workpiece to a temperature below its critical temperature while permitting the mandrel to rise in temperature by heat exchange with the workpiece, thereby effecting thermally induced shrinkage of the workpiece and thermally induced expansion of the mandrel with concomitant yielding and creeping of the workpiece.

11. The method recited in claim 10, and further including the steps of retracting at least an equatorial portion of the mandrel to release the axial restraint on the formed workpiece;

removing the workpiece from the mandrel; and cutting away the restricted circumferential equatorial portion of the workpiece.

12. The method recited in claim 10, and further including the steps of reheating the workpiece to effect stress relief thereof;

removing the thus stress relieved workpiece from the mandrel; and cutting away the restricted circumferential equatorial portion of the workpiece.

13. A rotatable mandrel for use in spinning a hollow dome-shaped article, comprising a body having a substantially dome-shaped external surface portion terminating in a circular base portion and having a central axis, said body having a radially inwardly disposed and circumferentially extending recessed working portion means disposed adjacent said base portion extending to a depth prescribed for gripping a portion of a spun dome-shaped article to prevent movement of the article in the axial direction during spinning and to permit removal of the dome-shaped article after spinning by jointly heating the mandrel and article; and means for supporting said body for rotation about said central axis.

14. The structure recited in claim 13, wherein the inwardly disposed portion is of annular shape and is divided into a plurality of arcuate segments, and further including means for retracting said segments in inwardly direction.

15. The structure recited in claim 13, wherein the inwardly disposed portion is of annular shape and is divided into a plurality of arcuate segments pivotally connected to the supporting means, and further including means for jointly retracting said segments in inward direction to a position of reduced radial extent.

16. A rotatable mandrel for use in spinning sheet metal to a hollow dome shape, comprising a hollow body having a substantially dome-shaped external surface portion terminating in an open ended base portion and having a central axis of revolution, said body having an annular array of arcuate segments of uniform width disposed adjacent the base portion, means including a circular member for supporting said body for rotation about said axis, said circular member being of smaller radial extent than said array of segments and disposed in encompassed internally spaced relation with said segments, means for pivotally connecting each of said segments to said circular member for movement in a direction parallel to a plane extending radially from said axis, from an extended position in which said segments jointly form a continuation of said dome-shaped external surface to a retracted position of lesser radial extent than said external surface, and means for retaining said segments in said extended position and for releasing said segments for movement to said retracted position.

17. A rotatable mandrel for use in spinning a hollow hemispherical article, comprising a body having a substantially hemispherical external surface portion extending from a polar portion to an equatorial portion circumferentially about a polar axis, said body having a radially inwardly disposed and circumferentially extending recessed working portion means disposed adjacent said equatorial portion extending to a depth prescribed for gripping a portion of a spun hemispherical article to prevent movement of the article in the axial direction during spinning and to permit removal of the hemispherical article after spinning by jointly heating and then cooling the mandrel and the article, and means for supporting said body for rotation about said polar axis.

18. The structure recited in claim 17, wherein the inwardly disposed portion is of annular shape and is divided into a plurality of arcuate segments, and further including means for retracting said segments in inwardly direction.

19. The structure recited in claim 17, wherein the inwardly disposed portion is of annular shape and is divided into a plurality of spherical segments pivotally connected to the supporting means, and further including means for jointly retracting said segments in inward direction to a position of reduced radial extent.

20. A rotatable mandrel for use in spinning sheet metal to hollow hemispherical shape, comprising a body having a substantially hemispherical external surface portion extending from a polar portion to an equatorial portion and having a polar axis, said body having an annular array of spherical segments at least partly disposed in said equatorial portion and extending from said equatorial portion to a region of greater latitude, means including a circular member for supporting said body for rotation about said polar axis, said circular member being of smaller radial extent than said array of segments and disposed in encompassed internally spaced relation with said segments, means for pivotally connecting each of said segments to said circular member for movement in a direction parallel to a plane extending radially from said polar axis, from an extended position in which said segments jointly form a continuation of said hemispherical external surface to a retracted position of lesser radial extent than said hemispherical external surface, and means for retaining said segments in said extended position and for releasing said segments for movement to said retracted position.

21. The structure recited in claim 20, in which the segments are each provided with an arcuate recess on their spherical surface, and the recesses are disposed in a circumferential array disposed in a latitudinal plane adjacent the equator of the body, when the segments are in the extended position.

References Cited

UNITED STATES PATENTS

| | | | |
|---|---|---|---|
| 438,406 | 10/1890 | Dewey | 72—83 |
| 716,241 | 12/1902 | Jones | 72—84 |
| 1,816,357 | 7/1931 | Boye | 72—83 |
| 1,966,713 | 7/1934 | Flint | 72—80 |
| 2,892,431 | 6/1959 | Killian et al. | 72—82 |
| 3,044,166 | 7/1962 | Kirkpatrick et al. | 72—83 |
| 3,067,707 | 12/1962 | Ellzey | 72—83 |
| 3,072,086 | 1/1963 | Birchfield et al. | 72—83 |
| 3,098,285 | 7/1963 | Kelzenberg et al. | 72—82 |
| 3,132,420 | 5/1964 | Pompa | 72—324 |

FOREIGN PATENTS

| | | |
|---|---|---|
| 344,357 | 9/1904 | France. |
| 425,128 | 2/1926 | Germany. |

RICHARD J. HERBST, *Primary Examiner.*